US010793214B1

(12) United States Patent
Yamasaki et al.

(10) Patent No.: US 10,793,214 B1
(45) Date of Patent: Oct. 6, 2020

(54) HEADLIGHT SUPPORT STRUCTURE OF SADDLE RIDING VEHICLE

(71) Applicant: HONDA MOTOR CO., LTD., Tokyo (JP)

(72) Inventors: Shota Yamasaki, Wako (JP); Souichiro Makino, Wako (JP); Keita Mikura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/788,543

(22) Filed: Feb. 12, 2020

(30) Foreign Application Priority Data

Mar. 14, 2019 (JP) .................................. 2019-047537

(51) Int. Cl.
B62J 6/027 (2020.01)
B62J 6/025 (2020.01)

(52) U.S. Cl.
CPC .............. B62J 6/027 (2020.02); B62J 6/025 (2020.02)

(58) Field of Classification Search
CPC ..... B62J 6/027; B62J 6/025; B62J 50/00; B62J 99/00
See application file for complete search history.

(56) References Cited

U.S. PATENT DOCUMENTS

| 2009/0231869 A1* | 9/2009 | Osugi | ........................ | B62J 6/02 362/475 |
| 2012/0314435 A1* | 12/2012 | Hoashi | ....................... | B62J 6/02 362/476 |

FOREIGN PATENT DOCUMENTS

JP 2009-220677 10/2009

* cited by examiner

Primary Examiner — Donald L Raleigh
(74) Attorney, Agent, or Firm — Rankin, Hill & Clark LLP

(57) ABSTRACT

In a headlight support structure of a saddle riding vehicle, a headlight support supporting a headlight is mounted on a bottom bridge connected between left and right sides of a front fork. In the headlight support structure, the headlight support is mounted in an integrally-molded headlight stay supporting the headlight. The headlight includes an aiming mechanism outside the headlight. The aiming mechanism is mounted in the headlight stay.

6 Claims, 7 Drawing Sheets

HEADLIGHT SUPPORT STRUCTURE OF SADDLE RIDING VEHICLE

INCORPORATION BY REFERENCE

The present application claims priority under 35 U.S.C. § 119 to Japanese Patent Application No. 2019-047537 filed on Mar. 14, 2019. The content of the application is incorporated herein by reference in its entirety.

TECHNICAL FIELD

The present invention relates to a headlight support structure of a saddle riding vehicle.

BACKGROUND ART

An aiming mechanism is conventionally known which is installed within a headlight case of a headlight to adjust an illuminating angle of a lamp body, the headlight case being secured to a bottom bridge of front forks through a stay (see, e.g., Patent Literature 1).

CITATION LIST

Patent Literature

[Patent Literature 1] JP-A No. 2009-220677

SUMMARY OF INVENTION

Technical Problem

In Patent Literature 1, a lower portion of the headlight case is secured to left and right independent stays which are attached to the bottom bridge. However, if there are variations in attachment accuracy for the left and right stays to the bottom bridge, a reduction in attachment accuracy for the headlight may result. And, the placement of the aiming mechanism within the headlight case leads to an increase in size of the headlight, so that the headlight occupies a lot of space in a front portion of the vehicle body.

It is an object of the present invention to provide a headlight support structure of a saddle riding vehicle which is capable of achieving improved attachment accuracy for the headlight and a reduced size of the headlight.

Solution to Problem

A headlight support structure of a saddle riding vehicle has a headlight support (83) supporting a headlight (45) and mounted on a bottom bridge (53) connected between left and right sides of a front fork (12). In the headlight support structure, the headlight support (83) is mounted in an integrally-molded headlight stay (56) supporting the headlight (45) in a swingable manner. The headlight (45) includes an aiming mechanism (60) outside the headlight (45), and the aiming mechanism (60) adjusts an illuminating angle. The aiming mechanism (60) is mounted in the headlight stay (56).

In the above configuration, the headlight support (83) may include a pair of left and right first supports (56a) and a second support (56c) placed between the left and right first supports (56a), and the aiming mechanism (60) may be mounted in the second support (56c).

Also, in the above configuration, the headlight (45) may have a lower rear portion elastically supported through elastic bodies (58) by shaft members (71) attached to the left and right first supports (56a), and the aiming mechanism (60) may be placed underneath the shaft members (71) and the elastic bodies (58).

Also, in the above configuration, the headlight (45) may include a downward extending portion (47x) and fitting holes (47c), the downward extending portion (47x) being mounted in a lower front portion of the headlight (45) and supported on a side of the second support portion (56c), the shaft members (71) and the elastic bodies (58) being inserted into the fitting holes (47c), and the downward extending portion (47x) may be placed in front of the fitting holes (47c).

Also, in the above configuration, the aiming mechanism (60) may include an aiming screw (77), a biasing member (78), a nut (76) and a falling prevention member (79), the aiming screw (77) being inserted through the downward extending portion (47x), the biasing member (78) being installed between the downward extending portion (47x) and the second support (56c), the nut (76) having a spherical protrusion (76a) fitted, in a swingable manner, into a spherical recess (56r) formed in a rear face of the second support (56c), the falling prevention member (79) being installed in a distal end portion of the aiming screw (77) in order to prevent the nut (76) from falling out.

Also, in the above configuration, the aiming mechanism (60) may be placed between the headlight (45) and the bottom bridge (53).

Advantageous Effects of Invention

In the headlight support structure of the saddle riding vehicle, the headlight support is mounted on the integrally-molded headlight stay that supports the headlight in a swingable manner, and the aiming mechanism for adjustment of an illuminating angle is included outside the headlight. And, the aiming mechanism is mounted in the headlight stay. Therefore, by using the integrally-molded headlight stay to support the headlight, the headlight is able to be attached with high accuracy. Further, by installing the aiming mechanism on the outside of the headlight, a reduction in size of the headlight can be achieved.

In the above configuration, the headlight support includes: the pair of left and right first supports; and the second support placed between the left and right first supports, and the aiming mechanism is mounted in the second support. Therefore, by installing the aiming mechanism in the second support of the headlight stay, the accuracy of the distance between the left and right first supports and the second support all of which are mounted in the headlight stay can be enhanced. As a result, the aiming adjustment is facilitated.

Also, in the above configuration, the headlight has the lower rear portion elastically supported through the elastic bodies by the shaft members attached to the left and right first supports, and the aiming mechanism is placed underneath the shaft members and the elastic bodies. Therefore, by elastic supporting the headlight, the vibration-insulating effects on the headlight are able to be produced. Also, by concentratedly placing the aiming mechanism underneath the shaft members and the elastic bodies, the aiming mechanism is able to be placed in a compact manner, and further the lower portion of the headlight and the aiming mechanism are able to be placed closer to each other. As a result, the aiming adjustment is capable of being performed by lightly operating the aiming screw. Also, by supporting the lower rear portion of the headlight, the support for the headlight is placed without being exposed to the front of the vehicle. As a result, enhanced external appearance can be achieved.

Also, in the above configuration, the headlight includes: the downward extending portion that is mounted in the lower front portion of the headlight and also is supported on the second support side; and the fitting holes into which the shaft members and the elastic bodies are inserted, and the downward extending portion is mounted in front of the fitting holes. Therefore, because the downward extending portion and the fitting holes are spaced from each other in the front-rear direction, the headlight is capable of being robustly supported by the first supports and the second support.

Also, in the above configuration, the aiming mechanism includes: the aiming screw that is inserted through the downward extending portion; the biasing member that is installed between the downward extending portion and the second support; the nut that has the spherical protrusion fitted, in a swingable manner, into the spherical recess formed in the rear face of the second support; and the falling prevention member that is installed in the distal end portion of the aiming screw in order to prevent the nut from falling out. Therefore, the fit between the spherical recess of the second support and the spherical protrusion of the nut in a swingable manner offers an improvement in following-up characteristics of the nut when the illuminating angle of the headlight is changed during the aiming adjustment with the aiming screw. Also, because of the falling prevention member, even if, in the user's operation, the aiming screw is greatly turned toward the loose side, the nut is able to be prevented from falling out, and also the illuminating angle of the headlight is able to be prevented from being angled too upward.

Also, in the above configuration, because the aiming mechanism is placed between the headlight and the bottom bridge, a clearance between the headlight and the bottom bridge can be effectively used to place the aiming mechanism.

DESCRIPTION OF EMBODIMENTS

Embodiments according to the present invention will now be described with reference to the accompanying drawings. It is noted that, throughout the description, words for directions such as front, rear, left, right, upward and downward are used in conformity with directions with respect to the vehicle body unless otherwise stated. Also, in each drawing, a reference sign FR denotes the front of the vehicle body, a reference sign UP denotes the upper side of the vehicle body and a reference sign LH denotes the left of the vehicle body.

Figure 1:
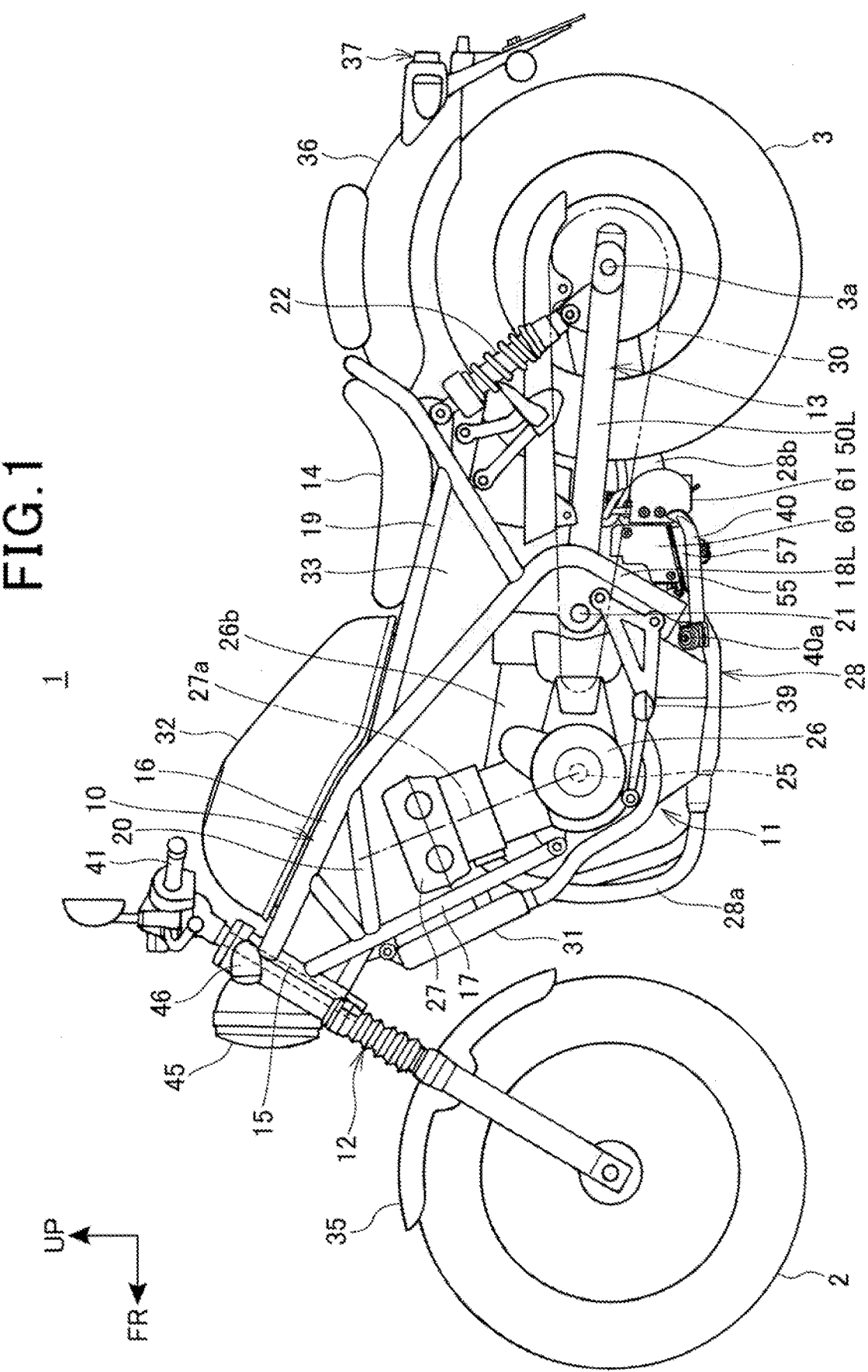
FIG. 1 is a left side view illustrating a motorcycle according to an embodiment of the present invention.

FIG. 1 is a left side view of a motorcycle 1 according to an embodiment of the present invention.

The motorcycle 1 is a vehicle in which: an engine 11 is supported by a body frame 10; a front fork 12 steerably supporting a front wheel 2 is steerably supported at a front end of the body frame 10; and swing arms 13 supporting a rear wheel 3 are placed in a rear portion of the body frame 10.

The motorcycle 1 is a saddle riding vehicle of which an occupant sits astride a seat 14, and the seat 14 is installed above the rear portion of the body frame 10.

The body frame 10 includes a head pipe 15, a pair of left and right main frames 16, a down frame 17, a pair of left and right pivot frames 18L, 18R (only the pivot frame 18L on the left side is shown), and a seat frame 19.

The head pipe 15 is mounted at the front end of the body frame 10. The left and right main frames 16 extend downward toward the rear from the head pipe 15. The down frame 17 extends downward toward the rear from below the main frames 16 on the head pipe 15. The left and right pivot frames 18L, 18R extend downward from rear ends of the main frames 16. The seat frame 19 extends rearward from rear portions of the main frames 16 and upper portions of the left and right pivot frames 18L, 18R.

The body frame 10 also includes a plurality of reinforcing frames 20 that are connected between an upper portion of the down frame 17 and upper portions of the main frames 16.

The swing arms 13 are pivotally supported on a pivot shaft 21 that is supported on the left and right pivot frames 18L, 18R. The pivot shaft 21 extends horizontally in the vehicle width direction. The pivot shaft 21 is supported on front portions of the left and right pivot frames 18L, 18R. The swing arms 13 have front end portions pivotally supported by the pivot shaft 21, and thus the swing arms 13 vertically swing about the pivot shaft 21.

The rear wheel 3 is pivotally supported by a rear-wheel axle 3a that is placed in rear end portions of the swing arms 13.

The motorcycle 1 includes a pair of left and right rear suspensions 22 that are stretched between the rear end portions of the swing arms 13 and the seat frame 19.

The engine 11 is placed underneath the main frames 16 and between the down frame 17 and the pivot frames 18L, 18R in the vehicle longitudinal direction, and the engine 11 is secured to the body frame 10.

The engine 11 includes: a crankcase 26 that supports a crankshaft 25 extending horizontally in the vehicle width direction (a left-right direction); and a cylinder section 27 that extends upward from a front portion of the crankcase 26. The cylinder section 27 has a cylinder axis 27a tilted forward with respect to the vertical.

An intake device (not shown) of the engine 11 is connected to an intake port on a rear face of the cylinder section 27.

An exhaust device 28 of the engine 11 includes: an exhaust pipe 28a that is connected to an exhaust port on a front face of the cylinder section 27; and a muffler 28b that is connected to a downstream end of the exhaust pipe 28a.

The exhaust pipe 28a extends downward from the exhaust port and further extends rearward through under the engine 11. The muffler 28b is placed on the outward side of the swing arm 13 and the rear wheel 3.

A rear portion of the crankcase 26 serves as a transmission casing 26b housing a transmission. The output of the engine 11 is transferred to the rear wheel 3 through a drive chain 30 which connects between an output shaft of the transmission and the rear wheel 3. A radiator 31 is supported by the down frame 17.

A fuel tank 32 is placed above the main frames 16 between the head pipe 15 and the seat 14. An area between the seat frame 19 and the main frames 16 is covered with a side cover 33.

The front wheel 2 is covered from above with a front fender 35 which is supported by the front fork 12. The rear wheel 3 is covered from above with a rear fender 36 which is placed at the rear of the seat 14.

A rear light unit 37 is attached to a rear end portion of the rear fender 36.

A pair of left and right steps 39 on which the occupant on the seat 14 rests his/her feet is placed in front of the left and right pivot frames 18L, 18R.

A side kickstand 40, which makes contact with the ground to support the vehicle body when the motorcycle 1 is parked, is supported at a lower end portion of the pivot frame 18L on the left side. The side kickstand 40 is mounted rotatably through a support shaft 40a mounted at an upper end.

In the parked motorcycle 1, the side kickstand 40 extends downward from the support shaft 40a to make contact with the ground. The side kickstand 40 is retracted to the vehicle body side, as illustrated in FIG. 1, by being rotated about the support shaft 40a in a rearward and upward direction.

A steering handlebar 41 is mounted at an upper end of the front fork 12.

On the front fork 12, a headlight 45 and a pair of left and right front blinkers 46 are supported. As described later in detail, specifically, on a bottom bridge 53 (see FIG. 2) that constitutes a part of the front fork 12, a headlight 45 is supported through a headlight stay 56 (see FIG. 2) which is attached to the bottom bridge 53.

Figure 2:
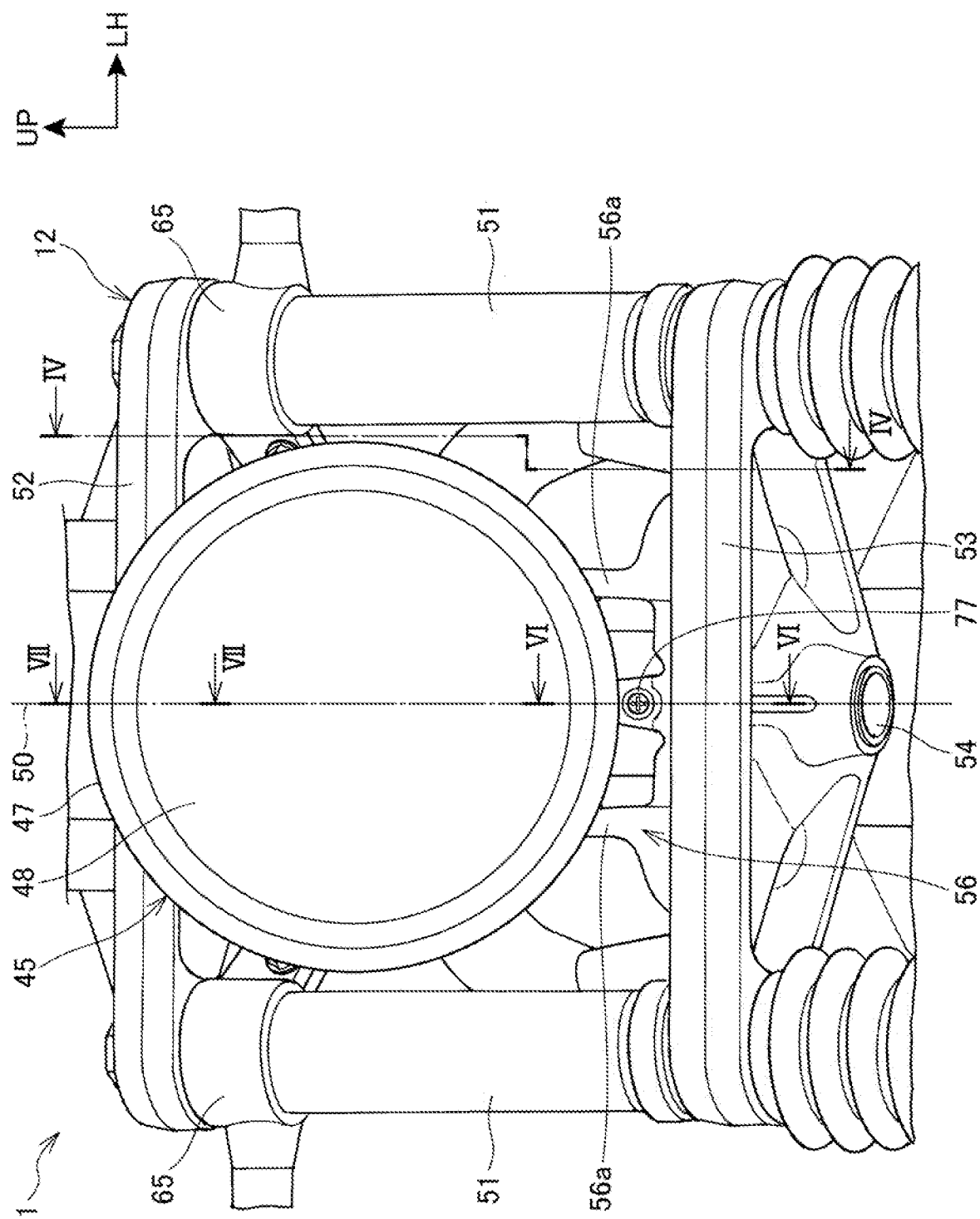
FIG. 2 is a front view illustrating a headlight and its surrounding.
Figure 3:
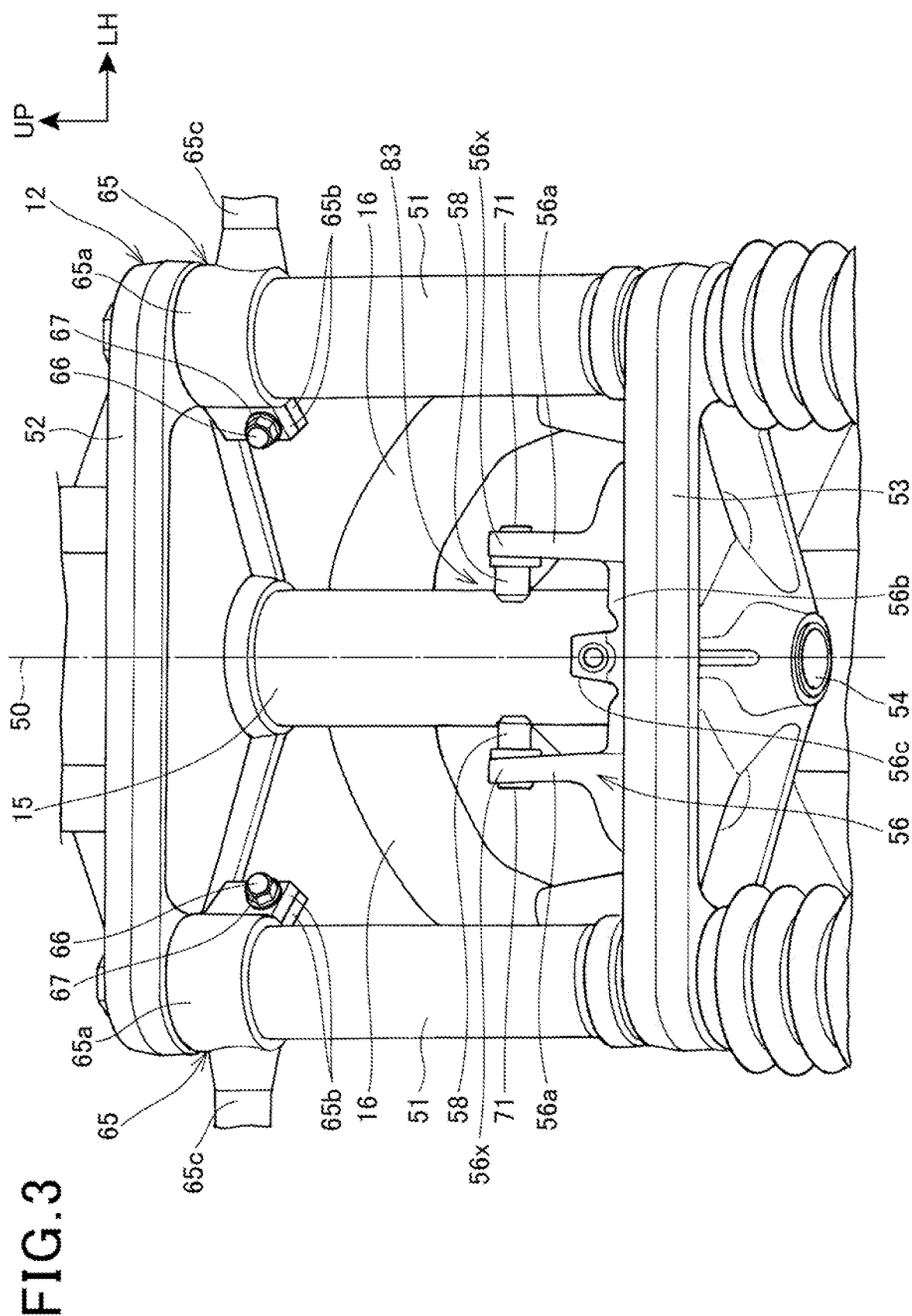
FIG. 3 is a front view illustrating the state where the headlight is removed from the state of FIG. 2.

FIG. 2 is a front view illustrating the headlight 45 and its surrounding. FIG. 3 is a front view illustrating the state where the headlight 45 is removed from the state of FIG. 2.

As illustrated in FIG. 2, the headlight 45 is placed in front of the front fork 12 in the front portion of the motorcycle 1.

As seen in the front view of the vehicle, the headlight 45 is placed on a body center line 50 extending vertically through the center of the vehicle width.

The front fork 12 includes: a pair of left and right fork tubes 51 which are buffers; a pair of top bridge 52 and bottom bridge 53 which are connected between the left and right fork tubes 51; and a steering stem 54 attached to the top bridge 52 and the bottom bridge 53.

The steering stem 54 is inserted into the head pipe 15 and also is rotatably supported by the head pipe 15.

The headlight 45 is placed above the bottom bridge 53 between the left and right fork tubes 51 as seen in the front view of the vehicle. Also, an upper portion of the headlight 45 is located in front of the top bridge 52.

As illustrated in FIG. 3, a headlight stay 56, which supports the headlight 45 (see FIG. 2), is attached to an upper face of the bottom bridge 53 (specifically, an upper face of a central portion in the vehicle width direction of the bottom bridge 53).

In the headlight stay 56, a pair of left and right upward extending portions 56a, a connection portion 56b, and a screw connection portion 56c are integrally formed. The left and right upward extending portions 56a extend upward; the connection portion 56b connects the left upward extending portion 56a with the right upward extending portion 56a; and the screw connection portion 56c extends upward from a central portion in the vehicle width direction of the connection portion 56b.

Headlight supporting bolts 71 are attached to upper end portions of the respective left and right upward extending portions 56a, and the headlight supporting bolts 71 elastically support the headlight 45 through rubber-made bushes 58 which are elastic bodies.

The screw connection portion 56c is a portion constituting a part of an aiming mechanism 60 (see FIG. 6) that adjusts an illuminating angle of the headlight 45.

The front blinkers 46 (see FIG. 1) are supported on upper portions (specifically, portions closer to the top bridge 52) of the left and right fork tubes 51 by resin-made blinker stays 65. Each of the blinker stays 65 includes a C-shaped fitting portion 65a, a pair of plate-shaped end portions 65b and a shaft portion 65c.

The C-shaped fitting portion 65a is a C-shaped portion fitted over the outer peripheral face of each of the left and right fork tubes 51. The plate-shaped end portions 65b are provided as a pair of flat plate shaped portions that extend respectively from two end portions of the C-shaped fitting portion 65a and also that are clamped together by a bolt 66 and a nut 67. The shaft portion 65c extends outward in the vehicle width direction from the C-shaped fitting portion 65a, and the front blinker 46 (see FIG. 1) is attached to a distal end portion of the shaft portion 65c.

In FIG. 2 and FIG. 3, as seen in the front view of the vehicle, the headlight supporting bolts 71 and both the upper portions of the left and right upward extending portions 56a of the headlight stay 56 are covered from the front with the headlight 45.

Figure 4:
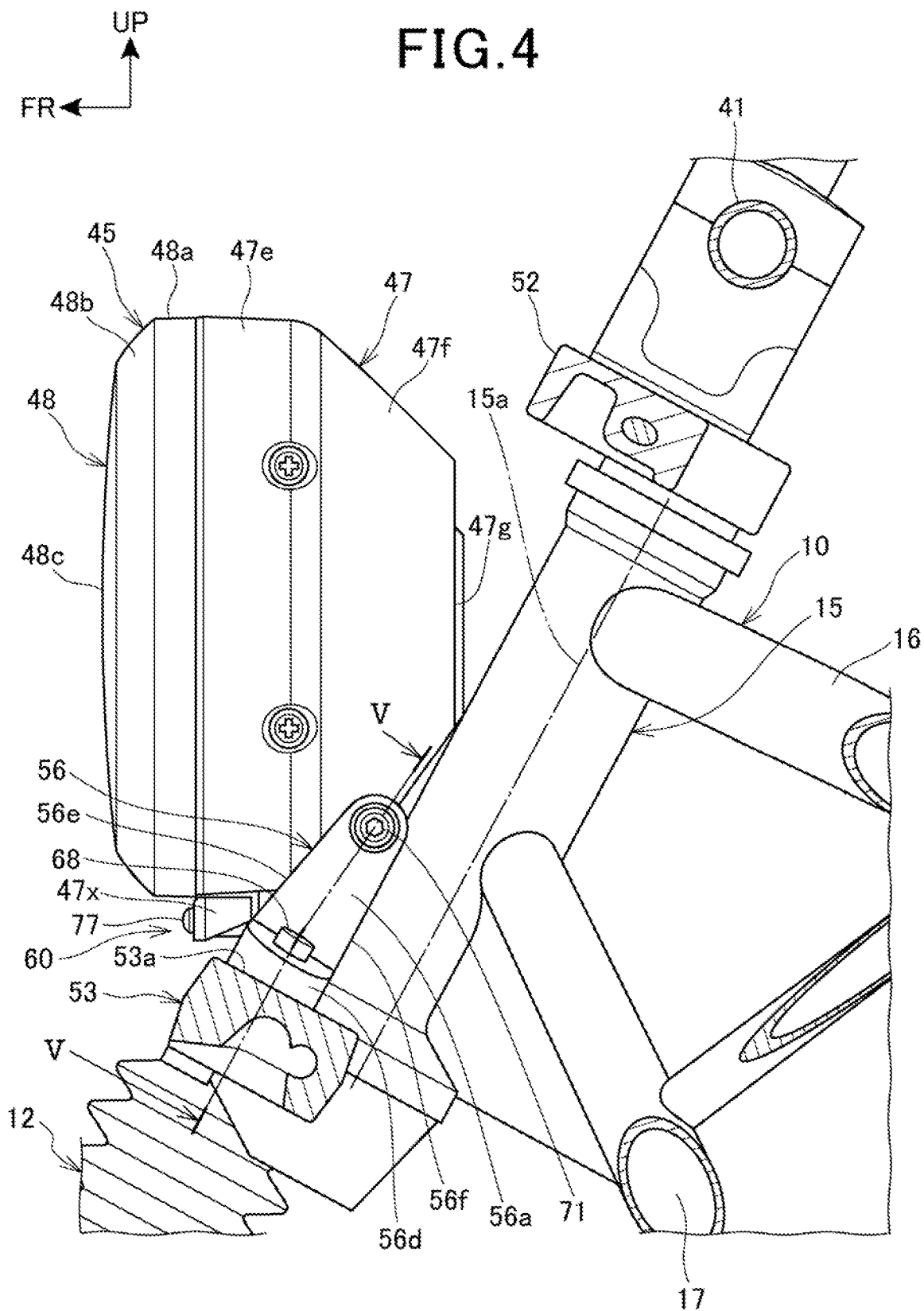
FIG. 4 is a cross-section view taken along the IV-IV line of FIG. 2.

FIG. 4 is a sectional view taken along the IV-IV line of FIG. 2

As illustrated in FIG. 4, the headlight 45 includes a headlight case 47 and a lens 48 that is attached to the front edge of the headlight case 47.

The headlight stay 56 is attached to an upper face 53a of the bottom bridge 53 with a pair of left and right bolts 68, and the headlight stay 56 is placed underneath the headlight 45.

Laterally protruding portions 56d integrally protrude respectively toward sides from lower portions of the left and right upward extending portions 56a of the headlight stay 56, and the left and right laterally protruding portions 56d are fastened to the bottom bridge 53 with bolts 68.

As seen in the side view of the vehicle, a front face 56e of the upward extending portion 56a is inclined with respect to the axis 15a of the head pipe 15 such that an upper side of the front face 56e is located closest to the axis 15a. A rear face 56f of the upward extending portion 56a extends approximately parallel to the axis 15a. In other words, the upward extending portion 56a is formed to have a front-rear width tapering down to the upper side as seen in the side view of the vehicle.

The headlight supporting bolts 71 are respectively attached to the upper end portions of the left and right upward extending portions 56a, and a lower rear portion of the headlight 45 (specifically, the headlight case 47) is supported in a vertically swingable manner by the left and right headlight supporting bolts 71.

In this manner, headlight 45 is supported at its lower rear portion, so that an upper portion of the headlight 45 is not required to be supported through a stay by the front fork 12 and the head pipe 15, and thus the external appearance of the front portion of the vehicle body as seen in the side view of the vehicle can be made simple.

Figure 5:
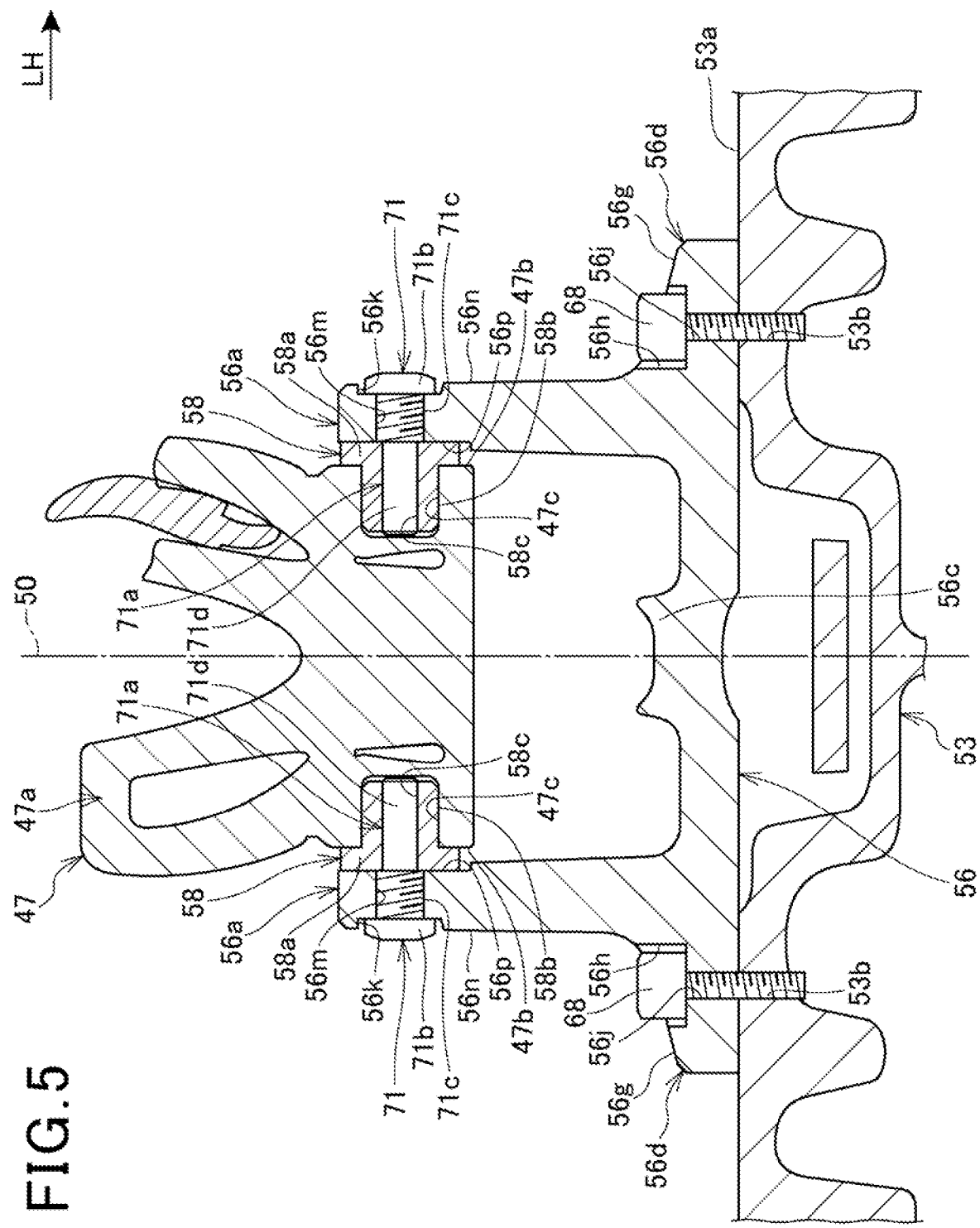
FIG. 5 is a cross-section view taken along the V-V line of FIG. 4.

FIG. 5 is a sectional view taken along the V-V line of FIG. 4.

Each of the left and right laterally protruding portions 56d of the headlight stay 56 includes: a countersink 56h that is formed in an upper face 56g of the laterally protruding portion 56d; and a bolt insertion hole 56j that is bored through the bottom of the countersink 56h.

The bolts 68 as a pair are inserted respectively through the bolt insertion holes 56j from the countersinks 56h of the left and right laterally protruding portions 56d, and also the bolts 68 are screwed into screw holes 53b formed in the bottom bridge 53.

Each of the left and right upward extending portions 56a includes a countersink 56k and a screw hole 56m in an upper end portion of the upward extending portion 56a. The countersink 56k is formed in an outside face 56n of the upward extending portion 56a. The screw hole 56m passes through from the bottom of the countersink 56k to an inside face 56p of the upward extending portion 56a.

Each headlight supporting bolt 71 integrally includes a shaft portion 71a and a head portion 71b that is formed at one end of the shaft portion 71a. The shaft portion 71a is made up of a screw portion 71c and an end shaft portion 71d of a circular cylindrical shape. The screw portion 71c is adjacent to the head portion 71b, and the end shaft portion 71d extends coaxially with the screw portion 71c from the end of the screw portion 71c.

The screw portion 71c is screwed into the screw hole 56m of the upward extending portion 56a, and thereby the headlight supporting bolt 71 is secured to the upward extending portion 56a.

The end shaft portion 71d protrudes beyond the inside face 56p of the upward extending portion 56a toward the other upward extending portion 56a.

Each bush 58 consists of a large diameter portion 58a and a small diameter portion 58b. The large diameter portion 58a abuts on or is in close proximity to the inside face 56p of the upward extending portion 56a. The small diameter portion 58b is adjacent to the large diameter portion 58a and is smaller in diameter than the large diameter portion 58a. The bush 58 includes a hollow portion 58c into which the end shaft portion 71d of the headlight supporting bolt 71 is inserted.

A supported portion 47a is integrally formed in a lower portion of the headlight case 47 and in a central portion in the vehicle width direction. The supported portion 47a is placed on the body center line 50, and sideways fitting holes 47c are formed respectively in left and right side faces 47b of the supported portion 47a. And, the rubber-made bushes 58 which are elastic members are fitted into the left and right fitting holes 47c.

The small diameter portions 58b of the bushes 58 are fitted into the left and right fitting holes 47c, and the large diameter portions 58a of the bushes 58 are placed between the inside faces 56p of the upward extending portions 56a and edges of the fitting holes 47c. The end shaft portions 71d of the headlight supporting bolts 71 are inserted into the hollow portions 58c of the bushes 58.

In this manner, the supported portion 47a of the headlight case 47 is elastically supported in a vertically swingable manner through the bushes 58 by the headlight supporting bolts 71 which are respectively attached to the left and right upward extending portions 56a.

In FIG. 2 and FIG. 5, as seen in the front view of the vehicle, the supported portion 47a is covered from the front with the headlight 45.

Figure 6:
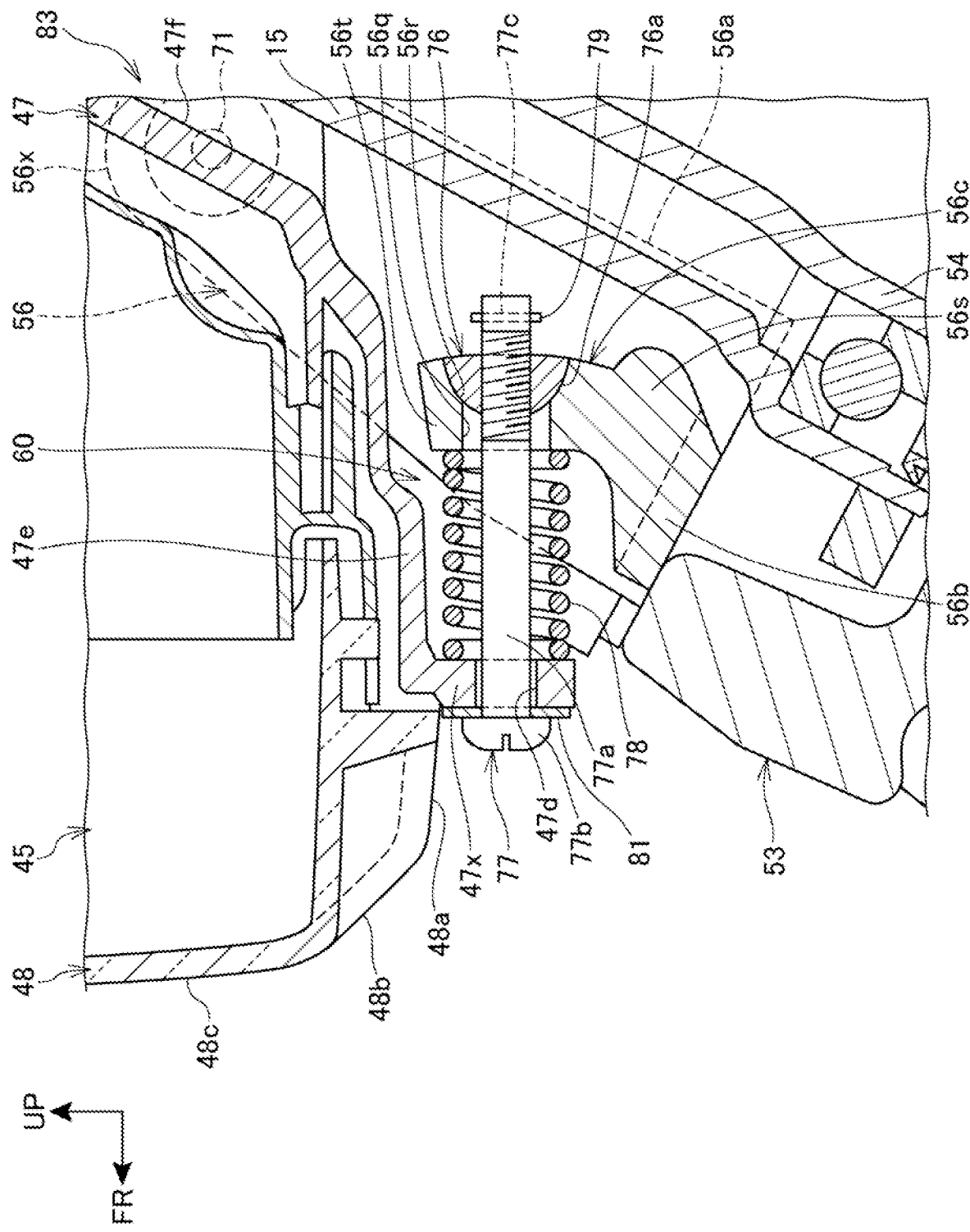
FIG. 6 is a cross-section view taken along the VI-VI line of FIG. 2.
Figure 7:
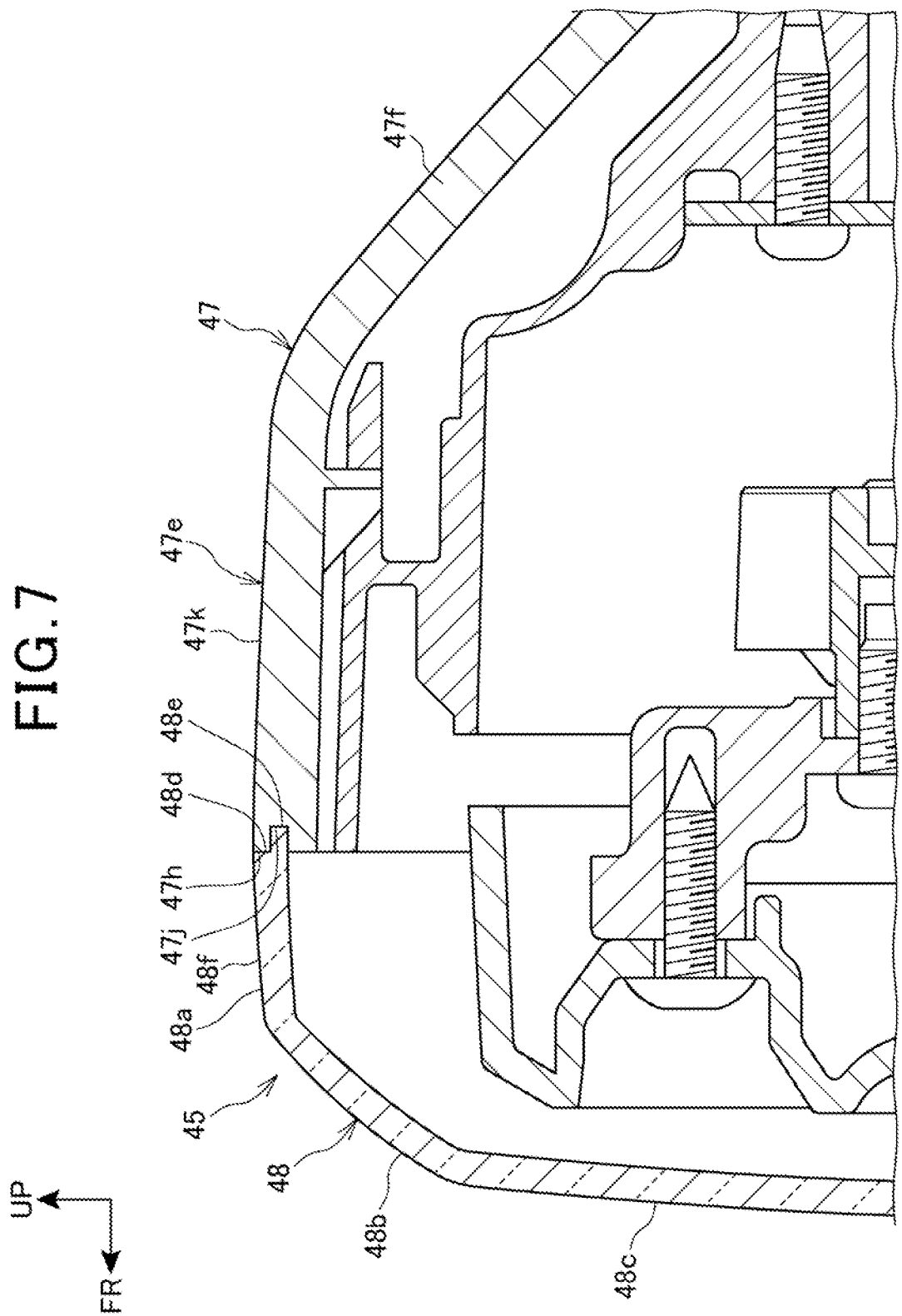
FIG. 7 is a cross-section view taken along the VII-VII line of FIG. 2.

FIG. 6 is a sectional view taken along the VI-VI line of FIG. 2, and FIG. 7 is a sectional view taken along the VII-VII line of FIG. 2.

As illustrated in FIG. 6, in a lower portion of the headlight 45 (specifically, the headlight case 47), an aiming mechanism 60 is mounted which adjusts an illuminating angle of light emitted by the headlight 45 to illuminate an area ahead of the vehicle. The aiming mechanism 60 is placed in front of the head pipe 15 and above the bottom bridge 53.

The aiming mechanism 60 includes the screw connection portion 56c of the headlight stay 56, a spherical nut 76, a downward extending portion 47x of the headlight case 47, an aiming screw 77, a compression coil spring 78 and a falling prevention pin 79.

The screw connection portion 56c includes, in an upper portion: a bolt insertion hole 56q that extends through in the front-rear direction; and a spherical seat 56r that is formed into a concave spherical surface at an edge portion of a rear end portion of the bolt insertion hole 56q. In the spherical seat 56r, the spherical nut 76 into which the convex spherical surface 76a with a spherical surface formed into a convex shape is fitted in a swingable manner.

The downward extending portion 47x is formed on a lower portion of the front edge portion of the headlight case 47 such that the downward extending portion 47x protrudes downward. The downward extending portion 47x includes a bolt insertion hole 47d extending through in the front-rear direction. The downward extending portion 47x is situated at the lowest end of the headlight case 47.

The aiming screw 77 integrally includes a shaft portion 77a and a head portion 77b formed at one end of the shaft portion 77a.

The shaft portion 77a is inserted, from the front side, through the bolt insertion hole 47d of the downward extending portion 47x and the bolt insertion hole 56q of the screw connection portion 56c, and a distal end portion of the shaft portion 77a is screwed into the spherical nut 76.

A washer 81 is arranged to be sandwiched between the downward extending portion 47x and the head portion 77b of the aiming screw 77.

The compression coil spring 78 is placed in a compressed state between the downward extending portion 47x and the screw connection portion 56c. Thereby, the downward extending portion 47x is biased forward by the elastic force of the compression coil spring 78.

On the distal end portion (i.e., the rear end portion) of the aiming screw 77, a falling prevention pin 79 is installed in order to prevent the spherical nut 76 from falling out of the aiming screw 77.

Specifically, a pin fitting hole 77c is bored through the rear end portion of the aiming screw 77 in a direction perpendicular to the shaft portion 77a, and the falling prevention pin 79 is pressed into the pin fitting hole 77c with both ends of the falling prevention pin 79 protruded from the shaft portion 77a.

In this manner, the installation of the falling prevention pin 79 in the end portion of the aiming screw 77 enables the restriction of the adjustment range (specifically, an upper limit (the state where the headlight 45 is turned most upward)) of the illuminating angle by use of the falling prevention pin 79 when the aiming screw 77 is turned to adjust the illuminating angle of the headlight 45. It is noted that, regardless of the falling prevention pin 79, any other structure producing similar falling prevention effects may be provided.

The screw connection portion 56c is formed into an L shape in cross section and integrally includes a rearward extending portion 56s and a rising portion 56t. The rearward extending portion 56s extends rearward from the connection portion 56b and the rising portion 56t rises from a rear end portion of the rearward extending portion 56s. The bolt insertion hole 56q and the spherical seat 56r are formed in the rising portion 56t.

In the headlight stay 56, as seen in the side view of the vehicle, the screw connection portion 56c is entirely mounted in a position overlapping the left and right upward extending portions 56a.

The left and right upward extending portions 56a (specifically, upper end portions 56x of the respective left and right upward extending portions 56a to which the headlight supporting bolts 71 are attached) and the screw connection portion 56c of the headlight stay 56 essentially constitute of a headlight support 83 to support the headlight 45.

The left and right upward extending portions 56a supports, in a swingable manner, the supported portion 47a of the headlight case 47 through the bushes 58 and the headlight supporting bolts 71. The screw connection portion 56c supports, in a swingable manner, the downward extending portion 47x of the headlight case 47 through the aiming screw 77 and the spherical nut 76.

In short, the headlight 45 is supported at three points by the left and right upward extending portions 56a and the screw connection portion 56c.

In FIG. 2 and FIG. 6, as seen in the front view of the vehicle, the aiming screw 77 (specifically, the head portion 77b) is exposed between the headlight 45 and the bottom bridge 53. This makes it easy to turn the aiming screw 77 with a tool from the front of the vehicle.

In FIG. 4 and FIG. 6, the headlight case 47 integrally includes: a peripheral wall portion 47e adjacent to the lens 48: a rear reduced diameter portion 47f that is gradually reduced in diameter from a rear edge of the peripheral wall portion 47e toward the rear; and a rear wall portion 47g that is connected to a rear edge of the rear reduced diameter portion 47f.

The lens 48 integrally includes: a lens peripheral wall portion 48a adjacent to the headlight case 47; a front reduced diameter portion 48b that is gradually reduced in diameter from a front edge of the lens peripheral wall portion 48a toward the front; and a front wall portion 48c that is connected to a front edge of the front reduced diameter portion 48b.

As illustrated in FIG. 7, a ring-shaped groove 47j, which is formed into a ring shape, is formed in an end face 47h of the peripheral wall portion 47e of the headlight case 47. Also, a ring-shaped protrusion 48e, which protrudes in a ring form, is formed on an end face 48d of the lens peripheral wall portion 48a of the lens 48. The ring-shaped protrusion 48e of the lens 48 is fitted into the ring-shaped groove 47j of the headlight case 47, so that the headlight case 47 and the lens 48 are coupled together.

An outer peripheral face 47k of the peripheral wall portion 47e of the headlight case 47 and an outer peripheral face 48f of the lens peripheral wall portion 48a of the lens 48 are formed flush with each other.

In FIG. 5 and FIG. 6, the supported portion 47a is placed in the rear reduced diameter portion 47f of the headlight case 47, and the downward extending portion 47x protrudes downward from the lowest end of a front end portion of the peripheral wall portion 47e of the headlight case 47.

Specifically, in the lower portion of the headlight case 47, a longer distance between the supported portion 47a and the downward extending portion 47x can be provided, and further, in the supported portion 47a, the left and right of the supported portion 47a (the headlight supporting bolts 71 attached to the left and right) are supported by the headlight stay 56. As a result, the supported portion 47a and the downward extending portion 47x of the headlight 45 are able to be robustly supported in the front-rear direction and the vehicle width direction.

As described and illustrated above in FIG. 3 and FIG. 6, in the headlight support structure of the motorcycle 1 as a saddle riding vehicle, the headlight support 83 supporting the headlight 45 is mounted on the bottom bridge 53 connected between the left and right of the front fork 12.

The headlight support 83 is mounted in the integrally-molded headlight stay 56 that supports the headlight 45 in a swingable manner, and the headlight support 83 includes the aiming mechanism 60 on the outside of the headlight 45, the aiming mechanism 60 adjusting the illuminating angle. The aiming mechanism 60 is mounted in the headlight stay 56.

With the configuration, the headlight 45 is able to be attached with high accuracy by being supported by the integrally-molded headlight stay 56. Also, a reduction in size of the headlight 45 can be achieved by installing the aiming mechanism 60 on the outside of the headlight 45. Further, the headlight 45 is able to be stably secured by mounting the headlight support 83 on the bottom bridge 53. Moreover, since the aiming mechanism 60 includes a part (i.e., the screw connection portion 56c) of the headlight stay 56, a component supporting the headlight 45 can also serve as a component of the aiming mechanism 60. As a result, a reduction in component count can be achieved.

Also, the headlight support 83 includes: the upward extending portions 56a (specifically, the upper end portions 56x of the upward extending portions 56a) as a pair of left and right first supports; and the screw connection portion 56c as a second support placed between the left and right upward extending portion 56a. The aiming mechanism 60 is placed in the screw connection portion 56c.

With the configuration, the aiming screw 77 of the aiming mechanism 60 is connected through the spherical nut 76 to the screw connection portion 56c of the headlight stay 56. This makes it possible to increase in accuracy of the positional accuracy (e.g., distance) of the left and right upward extending portions 56a and the screw connection portion 56c all of which are mounted in the headlight stay 56. As a result, the aiming adjustment is facilitated.

As illustrated in FIG. 4 to FIG. 6, the headlight 45 also has the lower rear portion (i.e., the supported portion 47a placed in the lower portion of the rear reduced diameter portion 47f) elastically supported through the bushes 58 as elastic bodies by the headlight supporting bolts 71 as shaft members attached to the left and right upward extending portions 56a. The aiming mechanism 60 is placed underneath the headlight supporting bolts 71 and the bushes 58.

With the configuration, the vibration-insulating effects on the headlight 45 are able to be produced by elastically supporting the headlight 45. Also, the concentrated placement of the aiming mechanism 60 underneath the headlight supporting bolts 71 and the bushes 58 makes it possible to place the aiming mechanism 60 in a compact manner, and further makes it possible to place the lower portion of the headlight 45 and the aiming mechanism 60 close to each other. As a result, the aiming adjustment is capable of being performed by a little operation of the aiming screw 77. Also, by supporting the lower rear portion of the headlight 45, the support for the headlight 45 is placed without being exposed onto the front of the vehicle. As a result, enhanced external appearance can be achieved.

As illustrated in FIG. 6, also, the headlight 45 includes: the downward extending portion 47x that is mounted in the lower front portion of the headlight 45 and also is supported on the screw connection portion 56c side; and the fitting holes 47c into which the headlight supporting bolts 71 and the bushes 58 are inserted, and the downward extending portion 47x is placed in front of the fitting holes 47c.

With the configuration, because the downward extending portion 47x and the fitting holes 47c are spaced from each other in the front-rear direction, the headlight 45 is capable of being robustly supported by the upward extending portions 56a and the screw connection portion 56c.

Also, the aiming mechanism 60 includes the aiming screw 77, the compression coil spring 78 as a biasing member, the spherical nut 76, and the falling prevention pin 79 as a falling prevention member.

The aiming screw 77 is inserted through the downward extending portion (47x) to extend through each of the lower portion (i.e., the downward extending portion 47x) of the headlight 45 and the screw connection portion 56c. The compression coil spring 78 is installed between the lower portion (the downward extending portion 47x) of the headlight 45 and the screw connection portion 56c. The spherical nut 76 has the convex spherical surface 76a as a spherical protrusion fitted, in a swingable manner, into the spherical seat 56r as a spherical recess formed in the rear face of the screw connection portion 56c.

The falling prevention pin 79 is installed in the distal end portion of the aiming screw 77 in order to prevent the spherical nut 76 from falling out.

With the configuration, the fit between the spherical seat 56r of the screw connection portion 56c and the convex spherical surface 76a of the spherical nut 76 in a swingable manner provides the improved following-up characteristics of the spherical nut 76 when the illuminating angle of the headlight 45 is changed during the aiming adjustment with the aiming screw 77. Also, because of the falling prevention pin 79, even if, in the user's operation, the aiming screw 77 is greatly turned toward the loose side, the spherical nut 76 is able to be prevented from falling out, and also the illuminating angle of the headlight 45 is able to be prevented from being angled too upward.

Also, because the aiming mechanism 60 is placed between the headlight 45 and the bottom bridge 53, a clearance between the headlight 45 and the bottom bridge 53 can be effectively used to place the aiming mechanism 60.

It should be understood that the embodiments set forth above are provided merely as an aspect of the present invention, and any modification and any application are possible without departing from the spirit and scope of the present invention.

Also, the present invention is not limited to the application to the motorcycle 1 and may be applicable to other saddle riding vehicles in addition to the motorcycle 1. It should be noted that the saddle riding vehicles include general vehicles in which a rider is astride the vehicle body, and are vehicles including motorcycles (including motor-assisted bicycles) and also three-wheeled vehicles and four-wheeled vehicles classified as ATV (All Terrain Vehicles).

REFERENCE SINGS LIST

1 . . . Motorcycle (saddle riding vehicle)
45 . . . Headlight
47c . . . Fitting hole
47x . . . Downward extending portion
53 . . . Bottom bridge
56 . . . Headlight stay
56a . . . Upward extending portion (first support)
56c . . . Screw connection portion (second support)
56r . . . Spherical seat (spherical recess)
58 . . . Bush (elastic body)
60 . . . Aiming mechanism
71 . . . Headlight supporting bolt (shaft member)
76 . . . Spherical nut (nut)
76a . . . Convex spherical surface (spherical protrusion)
77 . . . Aiming screw
78 . . . Compression coil spring (biasing member)
79 . . . Falling prevention pin (falling prevention member)
83 . . . Headlight support

The invention claimed is:

1. A headlight support structure of a saddle riding vehicle, in which a headlight support supporting a headlight is mounted on a bottom bridge connected between left and right sides of a front fork,
wherein the headlight support is mounted in a headlight stay supporting the headlight in a swingable manner, the headlight stay being integrally molded, and
the headlight includes an aiming mechanism outside the headlight, the aiming mechanism adjusting an illuminating angle and being mounted in the headlight stay.

2. The headlight support structure of the saddle riding vehicle according to claim 1, wherein the headlight support includes a pair of left and right first supports and a second support placed between the left and right first supports, and the aiming mechanism is mounted in the second support.

3. The headlight support structure of the saddle riding vehicle according to claim 2, wherein the headlight has a lower rear portion elastically supported through elastic bodies by shaft members attached to the left and right first supports, and the aiming mechanism is placed underneath the shaft members and the elastic bodies.

4. The headlight support structure of the saddle riding vehicle according to claim 3, wherein the headlight includes a downward extending portion and fitting holes, the downward extending portion being mounted in a lower front portion of the headlight and being supported on a side of the second support portion, the shaft members and the elastic bodies being inserted into the fitting holes, and the downward extending portion is placed in front of the fitting holes.

5. The headlight support structure of the saddle riding vehicle according to claim 4, wherein the aiming mechanism includes an aiming screw, a biasing member, a nut and a falling prevention member, the aiming screw being inserted through the downward extending portion, the biasing member being installed between the downward extending portion and the second support, the nut having a spherical protrusion fitted, in a swingable manner, into a spherical recess formed in a rear face of the second support, the falling prevention member being installed in a distal end portion of the aiming screw in order to prevent the nut from falling out.

6. The headlight support structure of the saddle riding vehicle according to claim 1, wherein the aiming mechanism is placed between the headlight and the bottom bridge.

* * * * *